(12) United States Patent
Spijker

(10) Patent No.: US 10,459,186 B2
(45) Date of Patent: Oct. 29, 2019

(54) OPTICAL FIBER CABLE INSTALLATION IN A PRESSURE SEWERAGE

(71) Applicant: Johannes Gerhardus Spijker, Dedemsvaart (NL)

(72) Inventor: Johannes Gerhardus Spijker, Dedemsvaart (NL)

(73) Assignee: Jelcer-IP B.V., Dedemsvaart (NL)

( * ) Notice: Subject to any disclaimer, the term of this patent is extended or adjusted under 35 U.S.C. 154(b) by 242 days.

(21) Appl. No.: 15/495,534

(22) Filed: Apr. 24, 2017

(65) Prior Publication Data

US 2017/0299837 A1    Oct. 19, 2017

Related U.S. Application Data

(62) Division of application No. 14/113,147, filed as application No. PCT/NL2012/050266 on Apr. 19, 2012, now Pat. No. 9,657,869.

(30) Foreign Application Priority Data

Apr. 21, 2011 (NL) ..................................... 2006652

(51) Int. Cl.
*G02B 6/50* (2006.01)
*G02B 6/44* (2006.01)
*H02G 1/08* (2006.01)
*F16L 9/18* (2006.01)
*H02G 1/06* (2006.01)

(52) U.S. Cl.
CPC ................ *G02B 6/502* (2013.01); *F16L 9/18* (2013.01); *G02B 6/4459* (2013.01); *G02B 6/4464* (2013.01); *G02B 6/4465* (2013.01); *H02G 1/06* (2013.01); *H02G 1/08* (2013.01)

(58) Field of Classification Search
CPC ............ H02G 1/00; H02G 1/08; H02G 1/086; H02G 1/081; H02G 1/088; H02G 9/00; H02G 9/06; G02B 6/50; G02B 6/502; G02B 6/4459; G02B 6/4464; G02B 6/4465; G02B 6/4401; G02B 6/4463; G02B 6/4466
See application file for complete search history.

(56) References Cited

U.S. PATENT DOCUMENTS 1,908,821 A * 5/1933 Cornell, Jr. ........... F16L 41/004
                                                  285/132.1
4,067,353 A * 1/1978 DeHoff .................. F16L 41/06
                                                    137/318
4,411,459 A * 10/1983 Ver Nooy ............... F16L 41/06
                                                  137/15.12

(Continued)

FOREIGN PATENT DOCUMENTS

EP    0294243    12/1988
EP    0450814    10/1991

(Continued)

Primary Examiner — Tyrone V Hall, Jr.
(74) Attorney, Agent, or Firm — Marcus C. Dawes; Daniel L. Dawes (57) ABSTRACT

A house connection for a cable in a medium conduit comprises a cable passage with which the cable is taken out of the medium conduit. The cable passage is provided with a cable tensioner with which a portion of the cable can be tensioned in the medium conduit. The cable passage is preferably part of a rotatable manifold.

19 Claims, 8 Drawing Sheets

(56) References Cited

U.S. PATENT DOCUMENTS

| | | | |
|---|---|---|---|
| 4,491,349 A * | 1/1985 | Rice | F16L 41/004 285/197 |
| 4,580,427 A * | 4/1986 | Akamatsu | B21C 37/294 29/890.053 |
| 4,648,744 A | 3/1987 | Knapp | |
| 4,917,539 A | 4/1990 | De La Salle | |
| 5,971,035 A * | 10/1999 | Griffioen | G02B 6/4464 138/109 |
| 6,198,871 B1 * | 3/2001 | Gregor | G02B 6/4463 385/134 |
| 6,564,823 B1 * | 5/2003 | Mankins | E03C 1/302 137/15.14 |
| 6,588,982 B2 * | 7/2003 | Nothofer | B08B 1/02 405/183.5 |
| 2004/0118454 A1 | 6/2004 | Leppert | |
| 2004/0130146 A1 * | 7/2004 | Mays | F16L 41/021 285/133.11 |
| 2004/0247264 A1 * | 12/2004 | Beals | G02B 6/4466 385/100 |
| 2006/0207656 A1 * | 9/2006 | Takahashi | B60H 1/00571 137/197 |
| 2010/0148138 A1 * | 6/2010 | Baker | F16L 7/00 254/134.3 R |

FOREIGN PATENT DOCUMENTS

| | | |
|---|---|---|
| EP | 1011001 | 6/2000 |
| GB | 2312995 | 11/1997 |
| WO | WO-03/060585 | 7/2003 |

* cited by examiner

OPTICAL FIBER CABLE INSTALLATION IN A PRESSURE SEWERAGE

RELATED APPLICATIONS

The present application is a divisional application of U.S. application Ser. No. 14/113,147, filed on Dec. 30, 2013, which in turn was related to International Patent Application, serial no. PCT/NL2012/050266, filed on Apr. 19, 2012, and Dutch national application, serial no. 2006652, filed Apr. 21, 2011, which are incorporated herein by reference and to which priority is claimed pursuant to 35 USC 120.

BACKGROUND

Field of the Technology

The invention relates to the field of the laying of a cable in a medium conduit. The invention also relates to a thus obtained medium conduit provided with a cable. The invention further relates to auxiliary means for use herein.

Description of the Prior Art

Cables for telecommunication, such as glass fibre cables in particular, are seen as the basis of a communication network. Efficiency requires that use be made of already existing pipe systems in the ground for the purpose of laying such a new cable network. A sewer forms a very suitable pipe network here. The sewer system in cities comprises a network of main sewers running below streets to which individual house sewers or house sewer connections are connected. The main sewer has a cross-section sufficiently large for a robot, and there are sewer drains through which a glass fibre cable can be introduced into the sewer. A method for laying a glass fibre cable in such a main sewer is per se known from EP 1868020.

In for instance an outlying area outside a city the number of connections to the sewer per kilometer is low. This causes too little flow in a normal sewer for the purpose of draining the sewer content. Use is thus often made of a pressure sewer. This is a pipe with a small diameter which is operated with a pressure pump such that the sewer content is actively pumped away. The house connection of a dwelling to a pressure sewer effectively consists of a catch pit which is emptied on a regular basis by pumping to the pressure sewer. As a result it is not possible to introduce a robot into an existing pressure sewer for the purpose of laying a glass fibre cable. Nor is it possible to simply open the pressure sewer in order to make a connection. It is further not possible to draw the glass fibre cable to a dwelling via a house connection of the sewer, but a bridging is necessary between a connection point in the pressure sewer and a further connection to the dwelling, such as for instance an inspection well.

The British patent application GB 2312995 discloses a solution for introducing a glass fibre cable into a medium conduit for a medium under pressure. This relates particularly to a water conduit or a gas conduit, with a pipe as primary component of the system. A cable is introduced into the pipe here together with a pulling member. The pulling member will pull the cable through the pipe. A spreadable and collapsible pulling member is used for a medium under pressure. The pulling member is provided for this purpose with suitable means, such as a collapsible screen. The screen absorbs the pressure and is in this way carried along with the flow in the pipe. Situated at a first longitudinal position where the cable has to be taken out of the medium conduit is a cable outlet. Situated at a second longitudinal position located a little further along (i.e. downstream) is a cable inlet with which the cable can once again be introduced into the pipe of the medium conduit. According to this British patent application, taking out the cable serves the particular purpose of circumventing obstacles in the medium conduit. In the case of a gas conduit this is for instance a closing valve.

It is however a drawback of the known medium conduit that the cable is situated inside the medium conduit at a position which cannot be determined. When the medium conduit transports something other than gas or liquid, such as in particular a pressure sewer, this can easily result in highly undesirable blockages. Not only must a blockage be cleared as quickly as possible, a blockage is also difficult to trace since the conduit is located under the ground and is optically non-transparent.

BRIEF SUMMARY

The current invention provides a method for arranging a cable in a pipe of a medium conduit suitable for transport of a medium using pressure. The method includes supplying a liquid and/or applying pressure in at least a part of the medium conduit extending from a first point. Next, the cable is drawn through the pipe of the medium conduit from the first point downstream to a second point, wherein the cable is carried along by the liquid and/or the pressure in the medium conduit and wherein an outer end of the cable is taken out of the medium conduit at the second point. An opening in the pipe is opened at a first longitudinal position between the first and the second point and a piece of the cable is taken out at the first longitudinal position while forming a loop. Next the opening in the pipe is closed with a manifold provided with a first cable passage, wherein the cable is passed through the cable passage, and then rotating the manifold to a protected position in which the cable passage and the cable carried outside are protected from damage by excavation work.

In one embodiment, the protected position is arranged at a lower side of the pipe, whereas the servicing position is arranged at an upper side of the pipe.

In another embodiment, the cable passage is protected in the protected position by means of the pipe or by means of a shell arranged in a longitudinal opening between a first and a second pipe part of the pipe.

In an additional embodiment, a part of the cable that is located in the pipe is guided from the first longitudinal position to a desired radial position in the pipe after forming of the loop.

In a related embodiment, the cable is further drawn in the pipe of the medium conduit between the second point and a third point, wherein the third point is situated at a distance downstream of the second point. First, the cable is taken out at the second point on the medium conduit such that an outer end of the cable and a portion of the cable is taken out with a length sufficient to span the distance between the second and the third point. Next, the liquid and/or applying pressure is supplied to a part of the medium conduit downstream of the second point. The cable is inserted at the second point in the medium conduit and drawing the cable through the pipe of the medium conduit downstream from the second point to the third point, wherein the cable is carried along by the pressure and/or liquid in the medium conduit.

In yet another embodiment, pieces of the cable are taken out of the medium conduit at various longitudinal positions between the first and the second or third point by opening an opening in the pipe at a longitudinal position between the first and the second point and then taking out the piece of the cable while forming a loop at the associated longitudinal position. Next, the opening in the pipe is closed with a manifold provided with a first cable passage, wherein the cable is passed through the cable passage. Next the manifold is rotated to a protected position in which the cable passage and the cable carried outside are protected from damage by excavation work by means of the pipe or a shell arranged in a longitudinal opening between a first and a second pipe part of the pipe.

In another embodiment, the cable is provided with a liquid pressure generator such that pressure forms downstream of the liquid pressure generator, whereby the cable can be displaced through the medium conduit, wherein the liquid pressure generator is part of a pulling member situated on an outer end of the cable, and wherein the liquid pressure generator comprises an elastic ring with which a diameter of the liquid pressure generator is adapted to a diameter of the pipe of the medium conduit.

In a further embodiment, a portion of cable extending in the pipe is tensioned from the first longitudinal position, in particular by using a cable tensioner at the first cable passage.

In one particular embodiment, the cable is a glass fiber cable.

In another embodiment, the first point and the second point are inspection wells.

In another particular embodiment, the medium conduit is chosen from one of a pressure sewer, a water conduit and a gas conduit.

In a related embodiment, the rotatable manifold includes a first and a second cable passage for guiding the cable out of the pipe and back into the pipe.

In another embodiment, the opening is present in a pipe part that is inserted into the pipe prior to drawing of the cable therethrough, and wherein the pipe part with the opening is rotatable with the manifold. In this embodiment, the manifold is present as a shell around the pipe part.

The current invention also provides a method for providing at a first longitudinal position a house connection to a cable which is part of a cable network intended for communication purposes. The method is performed by providing a medium conduit provided with a first cable passage defined in a manifold, said manifold having a protection position and a servicing position, in which protected position the cable passage is protected from damage by excavation work, rotating the first cable passage from the protected position to a servicing position, connecting a house connection cable to the cable, and then rotating the first cable passage from the servicing position to the protected position.

In a related embodiment, the protected position is arranged at a lower side of the pipe, whereas the servicing position is arranged at an upper side of the pipe.

In a separate embodiment, the protected position the cable passage is protected from damage during excavation work by means of the pipe or a shell arranged in a longitudinal opening between a first and a second pipe part of the pipe.

In yet another embodiment, the method further includes the step of taking a piece of the cable out at the first longitudinal position while forming a loop, after rotating the cable passage into the servicing position.

The current invention also provides a medium conduit suitable for transport of a medium using pressure. The medium conduit includes a first and a second inspection well, a pipe between said inspection wells, said pipe being provided at a first longitudinal position between said first and second inspection well with a pipe opening and a manifold covering said pipe opening. The manifold comprises a first cable passage through which a portion of the cable is brought outside the pipe for forming a loop, which manifold with the first cable passage is rotatable between a servicing position and a protected position in which the cable passage and the cable carried outside are protected from damage by excavation work.

In one particular embodiment, the cable loop of the medium conduit is connected to a house connection cable so as to establish a house connection.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
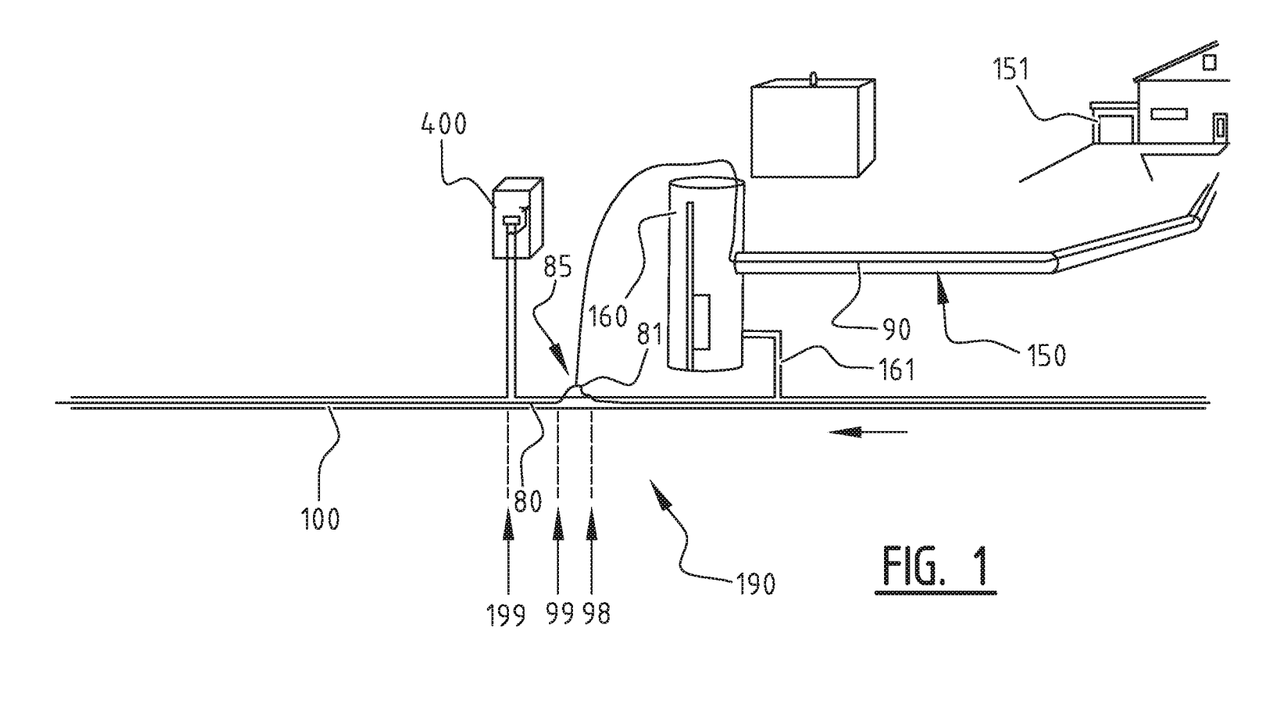
FIG. 1 shows a schematic view of a house connection to the medium conduit according to the invention.

FIG. 1 is a schematic view of a house connection 190 to medium conduit 100 according to the invention. In this embodiment medium conduit 100 is a pressure sewer. Not otherwise precluded is that the invention is applied to another type of medium conduit, such as a water conduit, a district heating system based on conduits with hot water or hot air, a gas conduit. The medium conduit is suitable for transporting a medium using pressure, wherein it is not necessary for the pressure to be continuously present; pressure sewers are for instance usually operated by a number of pumps which are only activated at regular or irregular times. The terms 'pressure sewer' and 'medium conduit' will be used interchangeably. The medium flows in the medium conduit in the direction indicated by the arrow. The initial purpose of a pressure sewer is to flush away excreta, surplus water and the like using pressure. The mass for flushing away is transferred for this purpose from a dwelling 151 via a house connection pipe 150 to a catch pit 160. When catch pit 160 has been filled to a certain level, it is emptied via channel 161 into medium conduit 100 in which the mass is displaced by means of pressure.

A communication cable 80, in particular a glass fibre cable, is arranged in medium conduit 100 so that no separate trenches need be dug for this glass fibre cable. Communication cable 80 will be referred to simply as cable hereinbelow. The use of the same system for other cables such as electricity cables is not precluded. Although reference is made in general sense here to cable 80, it is recommended that cable 80 comprises a set of individual cables, each intended for an individual connection. The signals from the individual cables are then transmitted in known manner at a collection point, i.e. by means of modulation, to a or a limited number of optical lines and thus transmitted further. Not precluded is that such a modulation step already takes place closer to dwelling 151, for instance at house connection 190. This is specifically effective when the number of connections becomes very high, so that a single cable 80 in the medium conduit can no longer comprise the individual cables.

A house connection 190 is required to connect dwelling 151 to cable 80 in medium conduit 100. A portion 81 of cable 80 is taken out of the medium conduit at a first longitudinal position 98 via a first cable passage, as will be further discussed with reference to FIG. 3 and following. The cable is reintroduced into medium conduit 100 via a second cable passage at a second longitudinal position 99. The mutual distance between the first and the second longitudinal positions 98, 99 is very short. The distance is typically less than one meter, while medium conduit 100 as a whole is kilometers long. A connecting cable 90 is connected via a weld 85 to the exposed portion 81 of cable 80. In this example the house connecting cable 90 is guided further to dwelling 151 via house connecting pipe 150. This is of course not essential, though is deemed favourable. An inspection well 400 is situated at a further longitudinal position 199 located downstream of the first and the second longitudinal positions 98, 99. This inspection well can be used for different functions, i.e. as cable inlet, as flushing tap and as inspection well for the state of the sewer itself.

Figure 2:
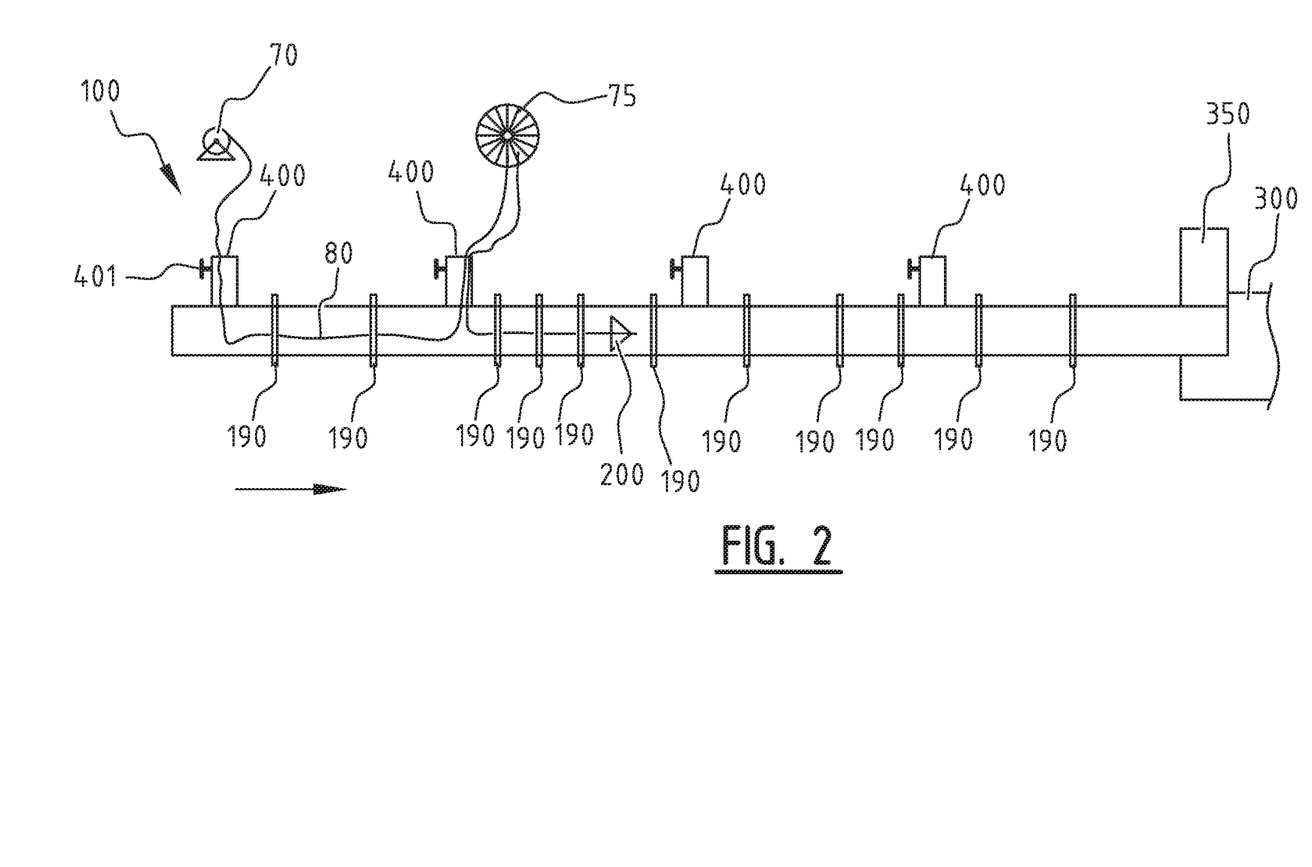
FIG. 2 shows a schematic view of the medium conduit.

FIG. 2 is a schematic view of medium conduit 100 in a more abstract form. The flow direction is once again indicated here with the arrow. This FIG. 2 shows a plurality of house connections 190 and a number of inspection wells 400. Also shown is the end point of pressure sewer 100, in this example the transition to a conventional sewer 300 which operates without pressure. An inspection well 350 is coupled to this transition. Normally the location of house connections 190 is substantially determined by the location of the dwellings for connection, so that the distance between house connections 190 is not or need not be constant. It is noted that, during installation or modification of this medium conduit 100 suitable for cables, additional house connections 190 can be drawn which do not correspond to existing dwellings. It has been found favourable for the inspection wells 200 to be arranged at a regular distance from each other. This is because cable 80 is guided through medium conduit 100 by means of a parachute 200 on the basis of the pressure present therein. When the distance between inspection wells 400 becomes too great, it is found more difficult to guide cable 80 with sufficient speed through the medium conduit. Inspection moreover has to be carried out by placing a camera in medium conduit 100 via this inspection well 400. It is here also the case that too great a mutual distance limits reliability. Coupled to the inspection well is a flushing tap 401 which can be used to flush the medium conduit, but also to provide liquid with which the cable can be pulled through the medium conduit. Not otherwise precluded is that different wells be arranged for various purposes, although this is not a model of efficiency. It is not precluded that the number of flushing taps 401 is smaller than the number of inspection wells 400. The flushing tap 401 can be connected directly to a water main but can also be connected to a local water tank, for instance a mobile water tank, such as a truck provided with a water reservoir. Use can be made of rainwater or other liquid instead of pure water. Determined ingredients can optionally be added to the water so that a cleaning of the medium conduit, in particular sewer, takes place when cable 80 is introduced. Flushing tap 401 can supply liquid under pressure. It is otherwise possible for one or more of the pumps possibly present in or on the medium conduit (particularly pumps of the pressure sewer) to be applied in order to provide the pressure.

When being laid, cable 80 is drawn off a reel 70. Cable 80 is then taken out of medium conduit 100 at the first inspection well 401 and wound onto a reel 75. Use is made here of one or more specific reels suitable for carrying kilometers of cable. Cable 80 is then reintroduced into medium conduit 100 and guided further. It is noted that house connections 190 and inspection wells 400 are already present before introduction of cable 80. After cable 80 has been carried through from a first point to a second point cable 80 is taken out of medium conduit 100 at a house connection 190. Cable 80 has to be laid at an appropriate location inside medium conduit 100, this taking place according to the invention using the cable passages. Use can be made of hooks or other tools to guide cable 80 out of pressure sewer 100 into the cable passages. This can take place despite the fact that the system is under pressure and an open connection will thus result in mass spraying out of medium conduit 100. The presence of flushing tap 401 first of all makes it possible to flush with water during drawing of cable 80. This already limits to some extent the foul nature of any spraying mass. After drawing of the cable from a first to a subsequent inspection well 400 the pressure can then be temporarily relieved. It is then possible to fish cable 80 out of pressure sewer 100. It is noted that variations to this specific laying method are possible within the invention.

For the purpose of drawing the cable 80 use is preferably made of a pulling member 200. Specific examples of pulling members 200 are known from the British patent application GB 2312995A. A first example is spreadable and has the form of an umbrella. The operation is rather more similar to a sail of a sailing vessel: pressure from behind, particularly in the form of a gas or vapour, is blown into the umbrella whereby it moves forward. In the case of a constriction the umbrella will first collide with the element causing the constriction. It is unclear whether the umbrella can then still be collapsed. Whether the pulling member can pass through the constriction cannot be inferred from the example. The stiffness which appears to be desirable for proper operation of the umbrella would seem to be incompatible with such maneuverability; it is possible to envisage the umbrella lying at an angle upstream of the constriction but not passing through the constriction. A second example is an inflatable balloon. GB 2312995 shows that the balloon can be inflated and opened from the passage using a cord. This would seem to require an ingenious system which is not however described. A balloon moreover appears to absorb much less pressure than the umbrella. It is not clear whether the cable is sufficiently displaced with a balloon as pulling member.

Figure 3:
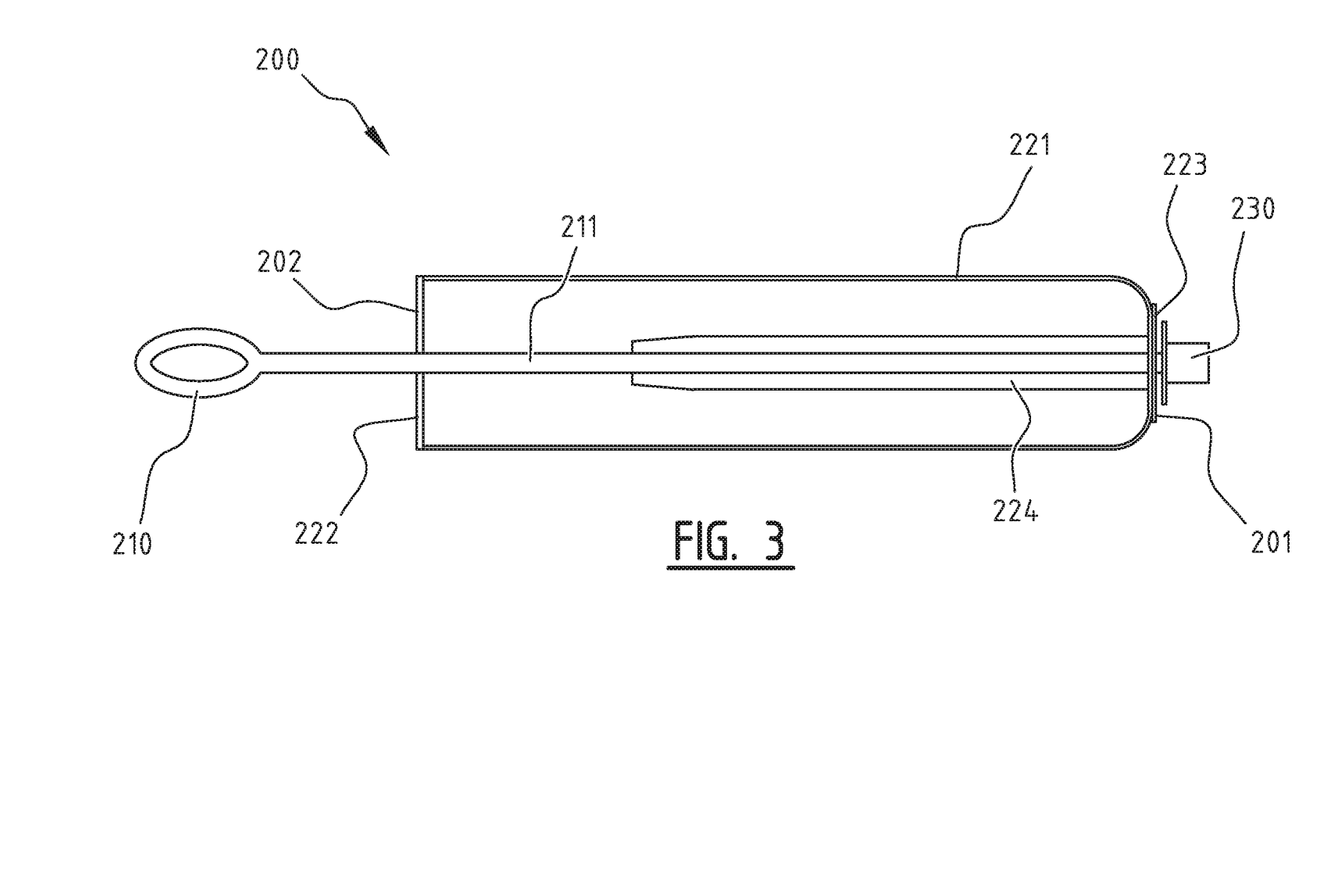
FIG. 3 is a schematic side view of the liquid pressure generator according to the invention.

FIG. 3 shows a schematic section of a pulling member 200 according to the invention. This pulling member 200 is a liquid pressure generator; it is suitable for advancing the cable in water or an aqueous medium, wherein the overpressure is normally much less great than the overpressure in a gas conduit. Pulling member 200 is also designed to pass through constrictions and bends in the medium conduit. The pulling member comprises a central shaft 211 formed from flexible material to which an eye 210 is connected for coupling of the cable. This eye is situated on a rear side 202 of pulling member 200. The front side 201 of the pulling member can comprise a head 230 in which for instance a camera is encased. A pressure distributing ring 223 is also present in this example. Arranged around central shaft 211 is an elastic ring 221 having on the rear side 202 a layer of water-repellent material 222. The elastic ring 221 is for instance designed to be suitable for a medium conduit with a diameter of 2-20 cm, in particular 4-12 cm. The elasticity is particularly such here that pulling member 200 can also pass through a constriction or bend in a narrow pipe.

An intermediate body 224 of elastic material is present between central shaft 211 and elastic ring 221. Intermediate body 224 is effectively less elastic than elastic ring 221. Elastic ring 221 in particular, and preferably also intermediate body 224 are porous in order to increase the compressibility. It is desirable here for the porosity of intermediate body 224 to be lower than the porosity of elastic ring 221. Intermediate body 224 is also intended for the purpose of improving the adhesion of central shaft 211 to elastic ring 221. This adhesion is particularly desirable to prevent the elastic ring 221 remaining jammed against the pipe wall while the central shaft 211 breaks loose and shoots forward. The risk of such a release occurs particularly in the case of constriction or sharp bends. The intermediate body preferably extends for this purpose over a considerable portion of the length of the pulling member, for instance at least 30% and more preferably at least 50%. This considerable portion is situated here particularly on the front side of the pulling member as shown in FIG. 3. The intermediate body is preferably provided with a rough outer side. Rough is here understood to mean non-smooth, and in particular that the intermediate body does not have a purely cylindrical form. The intermediate body is particularly anchored in central shaft 211 and/or in elastic ring 221. Such an anchoring in for instance central shaft 211 can be achieved by making the central shaft in a determined form with an injection moulding technique, after which the intermediate body is arranged with a suitable manufacturing technique, such as injection moulding, coating, arranging as foil which is heated wherein it melts, and so on. The intermediate body can of course also be arranged here as a sequence of layers, wherein variation in the composition of the layers is not precluded. A very favourable manner of improving adhesion between intermediate body 224 and elastic ring 221 is to further arrange a specific adhesion layer which provides particularly for cross-linking of at least apart of intermediate body 224 (the 'outer side') with at least a part of the elastic ring (the 'inner side'). Suitable materials for such an adhesion layer and processes for adhesion will be per se known to the skilled person in the field of polymeric materials. Polyacrylate resins can be envisaged here. Central shaft 211 preferably extends over the whole length of the liquid pressure generator, although this is not strictly necessary. When the medium conduit is very clean and reliable (such as for instance a water conduit or a sewer that has not yet been taken into use), it is possible to suffice with a simpler variant, wherein for instance intermediate body 224 is absent and/or central shaft 211 does not run wholly through pulling member 200. The liquid pressure generator can also be designed such that elastic ring 221 extends beyond the rear of central shaft 211 and for instance provides for a partial or complete encasing of eye 210 (or a means embodied in other manner for coupling of the cable). This may for instance be favourable when the water-repellent layer 222 is embodied as a body, for instance a cap-like body. Such a form can be favourable in ensuring that pressure is exerted on both the flexible central shaft 211 and the elastic ring 221 when pulling member 200 is situated upstream of a constriction in the pipe. It is not even precluded that the cable and the eye 210 are connected to such a water-repellent body 222, which is connected in turn to central shaft 211 and elastic ring 221. It can likewise be the case that such a water-repellent body 222 is integrated with central shaft 211, in particular that it is formed as a single component in a combined manufacture (such as for instance injection moulding). It is however desirable in such embodiments that the water-repellent body 222 has sufficient flexibility in a direction away from central shaft 211 and has or can take on a substantially oval form such that, if the elastic ring 221 expands, the water-repellent body 222 acquires a greater diameter and can ensure that sufficient water is held back for the purpose of developing sufficient liquid pressure.

The pulling member 200 shown in FIG. 3 has a head 230, preferably provided with a camera and optionally a transmitter. Accommodation of such electronic devices in central shaft 211, elastic ring 221 and/or intermediate body 224 is not precluded. The intermediate body 224 in particular appears to be highly suitable as an envelope for electronic components and/or devices because the electrical devices need then only be arranged after forming of central shaft 211 and because the material of the intermediate body can be selected such that a sufficiently sealed envelope and protection are ensured. If desired, central shaft 211 can be provided with a cavity suitable for the placing of one or more electronic devices. Head 230 can be received in the central shaft (i.e. manufactured as a single component). Head 230 can optionally also be removed, although it is favourable for the liquid dynamics if the front side has in cross-section a roughly parabolic form or a pointed form. Examples of electronic devices are cameras, wireless transmitter, wireless receivers, devices for position determination (e.g. according to the GPS system), sensors such as temperature sensors, sensors for measuring gases and/or concentrations of gases or constituents in solution, acoustic sensors and so forth. It will be apparent to the skilled person that intermediate body 224, central shaft 211 and/or elastic ring 221 can be adapted for an optimum design of the electronic devices, for instance through the design of channels and/or cavity. An antenna for a wireless transmitter and/or receiver can moreover be arranged on or in central shaft 211 so that the antenna has sufficient size to enable an adequate wireless reception through the ground (and pipe wall of the medium conduit).

It is noted that the system shown in FIG. 1-5 of the British patent application GB 2312995 differs considerably in essence from that according to the invention. It shows a conduit with a valve around which a cable is guided. The pulling members of the British patent application are collapsible so that they can pass through a cable passage. The cable appears to lie loosely in the pipe and is not positioned in any way at all in the pipe, and is lifted at a cable passage wherein it crosses through the pipe in vertical direction. The opening in the pipe is closed with a saddle piece. That the cable lies loosely need not be a problem in gas conduits, but in medium conduits for liquid and possibly solid constituents this soon results in problems: blockages can occur or, alternatively, pressure on the solid constituents can entrain the loose cable, with breakage as likely result. Breakage is likewise not unlikely when the pulling member is lifted upward through the cable passage as shown in FIG. 4 of the British patent application, wherein the cable effectively forms a very tight loop in the cable passage. In the context of the use of glass fibre cable breakage is not only undesirable because of the complication that individual cables in the cable must be manually connected to each other once the location of the break has been found. Such a breakage is also undesirable because a coupling increases the internal resistance of the glass fibre cable, and thereby reduces the quality of transmission of communication signals (often expressed as the signal-noise ratio).

Figure 4:
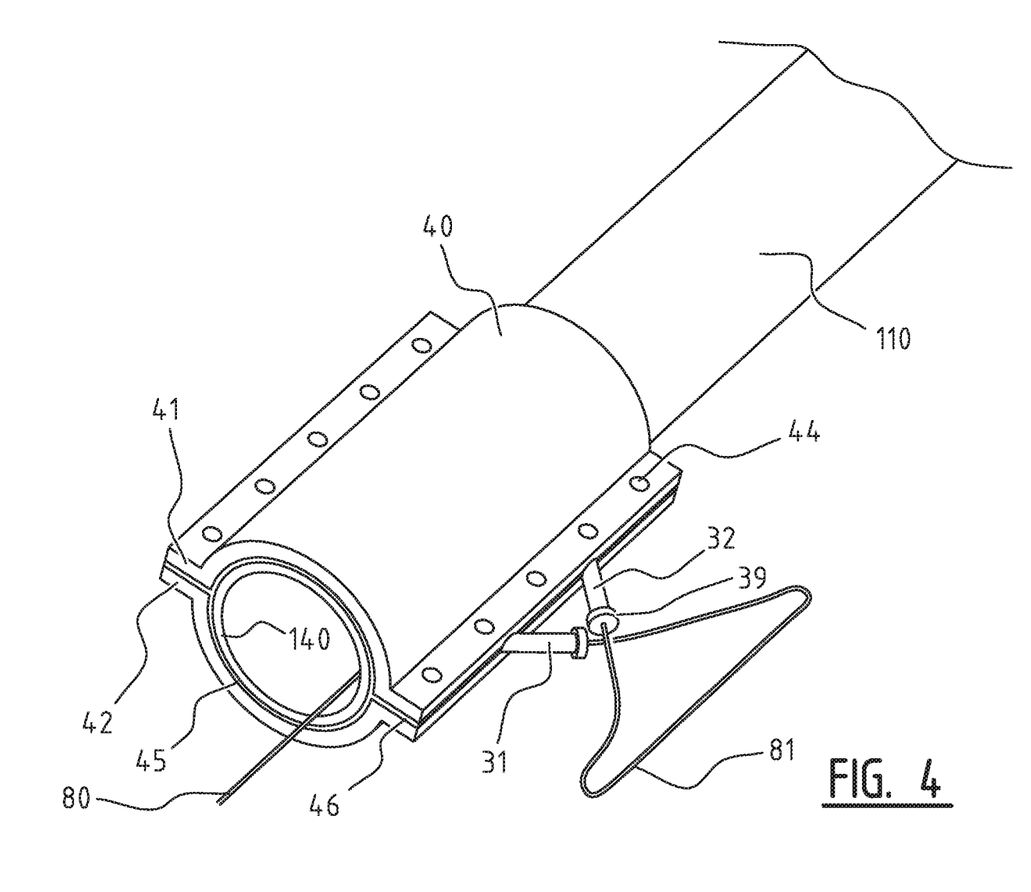
FIG. 4 is an aerial perspective view of the shell with cable passages.
Figure 10:
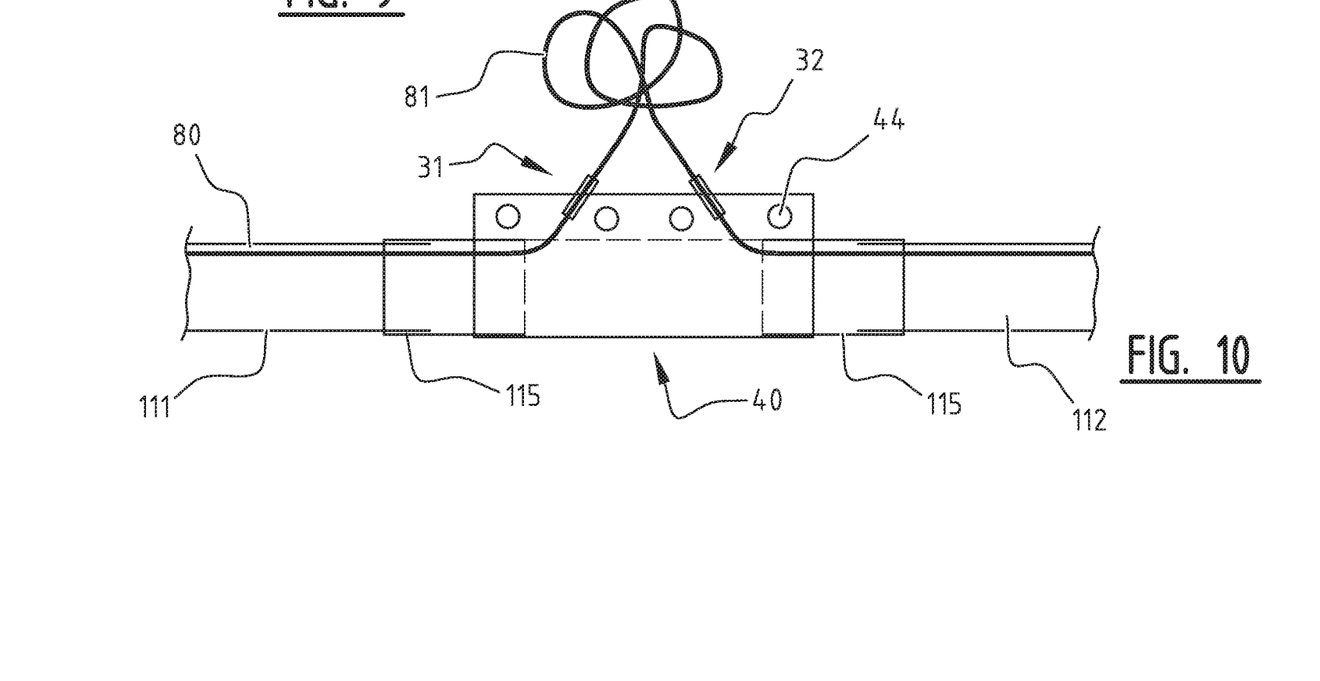
FIG. 10 is a schematic side view of the shell and medium conduit.

FIG. 4 shows a part of medium conduit 100 which functions as manifold with both the first and the second cable passage 31, 32. FIG. 10 shows a schematic side view. Medium conduit 100 comprises in this example a pipe 110. A portion is removed from pipe 110, thereby creating a longitudinal opening between a first pipe part 111 and a second pipe part 112. A shell 40 is placed in the longitudinal opening on pipe 110 (or pipe parts 111, 112). Shell 40 is attached to pipe parts 111, 112 with sliding sleeves 115. A loop 81 in cable 80 is situated outside the pipe. A first and second cable passage make it possible for cable 80 to leave shell 40 without liquid beginning to leak or even spraying out of the pipe.

As shown in more detail in FIG. 4, shell 40 comprises a first half 41 and a second half 42 which in this embodiment both cover 180 degrees. This is by no means essential however. The two halves 41, 42 of shell 40 are fixed to each other with a usual and reliable fastening means 44. A sealing means 46 is present to prevent leakage. Use is made in this example of a connection with nuts and bolts. In this example the shell covers a pipe part 140 which is provided with an opening (see FIG. 9). A sealing ring 45, for instance of rubber, provides for a suitable sealing between pipe part 140 and shell 40. Cable passages 31, 32 lie at an angle to the axis of pipe 110, this angle preferably being less than 60 degrees, more preferably less than 45 degrees. Cable passages 31, 32 are provided with a liquid closure 39. The use of a shell comprising two halves 41, 42 is favourable since at least a portion of cable passages 31, 32 can thus be embodied as profile in the halves. Pipe 110 and shell 40 can be formed from conventional construction materials suitable for use in the medium conduits. Known materials are concrete, construction plastics such as polyethylene, polyvinyl chloride, stainless steel and so on. Shell 40 can be mounted rotatably on pipe 110, for instance through the use of sliding sleeves, as is known to the skilled person. Such a construction has the additional advantage that the manifold can be placed in simple manner between a first and a second pipe part of pipe 110, i.e. shell 40 can be pushed under or over a pipe part and then back again in the other direction.

Figure 5:
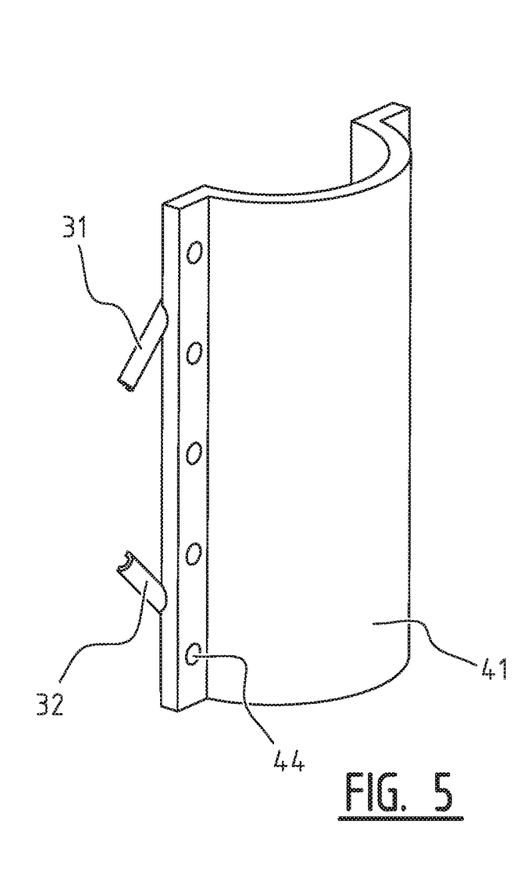
FIG. 5 shows a component of the shell.
Figure 6:
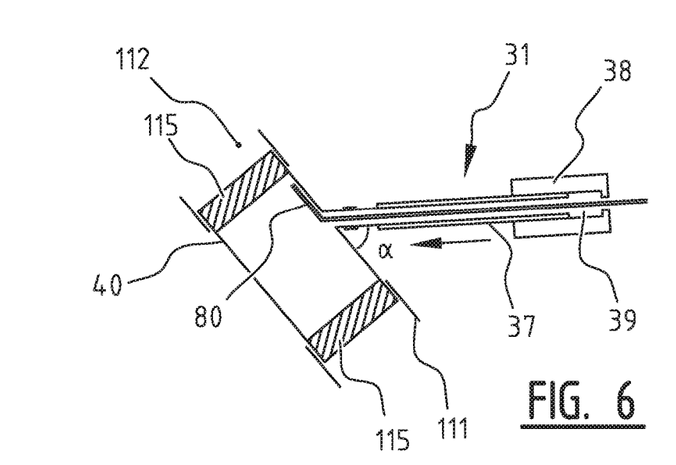
FIG. 6 shows a schematic section of a cable passage.
Figure 7:
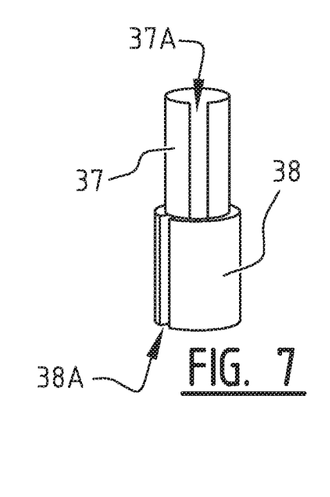
FIG. 7 shows a first component of the cable passage.
Figure 8:
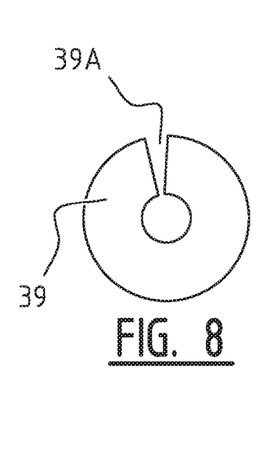
FIG. 8 shows a second component of the cable passage.

FIG. 5 is a schematic side view of a first half 41 of the shell with cable passages 31, 32. Shown here is that cable passages 31, 32 are constructed from two parts, each coupled to a half 41 of the shell. This construction forms a specific implementation of a favourable embodiment according to the invention. According to this embodiment, the first cable passage is part of a manifold covering an opening in the pipe. The manifold comprises a first and a second component with a mutual surface extending in a longitudinal direction through the first cable passage. The design is such that, in order to carry the cable into the first cable passage, the cable is placed in the first component of the manifold, after which the second component is secured to the first component and closes the surface of the first cable passage in its longitudinal direction. In the implementation according to FIG. 5 the shell forms the manifold. The first half 41 of the shell is here the first component and the second half of the shell is the second component of the manifold. Cable 80 is laid in the first half 41, after which the second half of shell 40 is placed in a manner such that the surface between the first and the second half is closed. This creates a cable passage which in this example encloses the cable as a ring. Fixing of the first half to the second half takes place in this embodiment with nuts and bolts. The further components of the cable passage as shown in FIG. 6-8 likewise have an exposed surface in the longitudinal direction (i.e. a groove) through which the cable can be drawn. Where the first and the second component here each form a half, the second component can also simply be a rubber element which closes a groove or incision in the cable passage. Nor is it precluded that the second component is an adhesive layer applied to the first component once the cable has been laid in the cable passage.

FIG. 6 shows a schematic section of the first cable passage 31 connected to shell 40. FIGS. 7 and 8 show components thereof in more detail. Shell 40 is situated here between a first pipe part 111 and a second pipe part 112 and is mounted rotatably on these pipe parts 111, 112 with sliding sleeves 115. Cable passage 31 encloses an angle .alpha. with the axis through the pipe. Cable passage 31 is provided with a cable tensioner with which cable 80 is tensioned along a wall of the pipe. This prevents the cable causing blockages. The cable tensioner comprises a means 38 for securing the cable 80 and a means 37 for tightening the cable 80. It is noted that the tightening means 37 can also be a motor or a pulley, and need not necessarily be fixed to cable passage 31. In this example both means 37, 38 comprise gaps 37A, 38A with which the means can be placed around the uninterrupted cable 80. Applied in this example for means 37 is a screw turnbuckle, and for means 38 a clamping bush fitting. FIG. 8 also shows a ring 39, a number of which are applied in the liquid closure. This ring 39 is also provided with a gap 39A. The rings are placed inside the screw turnbuckle 38 and downstream of clamping bush fitting 37.

Figure 9:
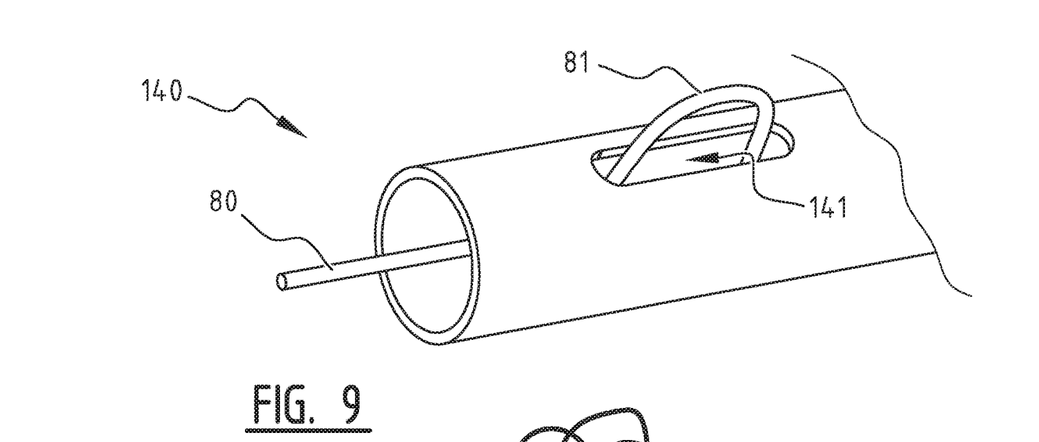
FIG. 9 shows a pipe part enclosed by the shell.

FIG. 9 shows in more detail the pipe part 140 covered by shell 40 (not shown in FIG. 8). Use of such a concealed pipe part 140 has the first advantage that the mechanical and thermomechanical properties of the shell plus pipe part are highly similar to the rest of pipe 110. This corresponds to existing practice, experience and patterns of expectation in the field. A second advantage is that a double closure is created, this reducing the risk of leakage. The shell can be embodied here in a relatively fine material, whereby the two halves of the shell can fit together well. A further advantage is that there is only an opening 141 of limited size. When the shell is temporarily removed or opened in order to take out the cable 80, and there is still liquid present in the medium conduit, this liquid will not immediately flow into the ground, or cause a small overflow or pool of sludge, but will only be able to exit via the opening. Since the opening 141 for taking out the cable is preferably rotated to a servicing position on the upper side, the liquid will in this case remain inside the pipe. Opening 141 extends particularly in the axial direction. The length of the opening determines the space for forming of the loop; too small a length results in the possible risk of kinking and breaking of the cable; too great a length makes it more difficult to completely prevent leakage. Arranged in the pipe part in a specific embodiment is a channel which is suitable for guiding the cable. The channel particularly forms a cavity which debouches in opening 141. Such a channel is an additional aid for positioning the cable in the desired radial position in the pipe.

Figure 11:
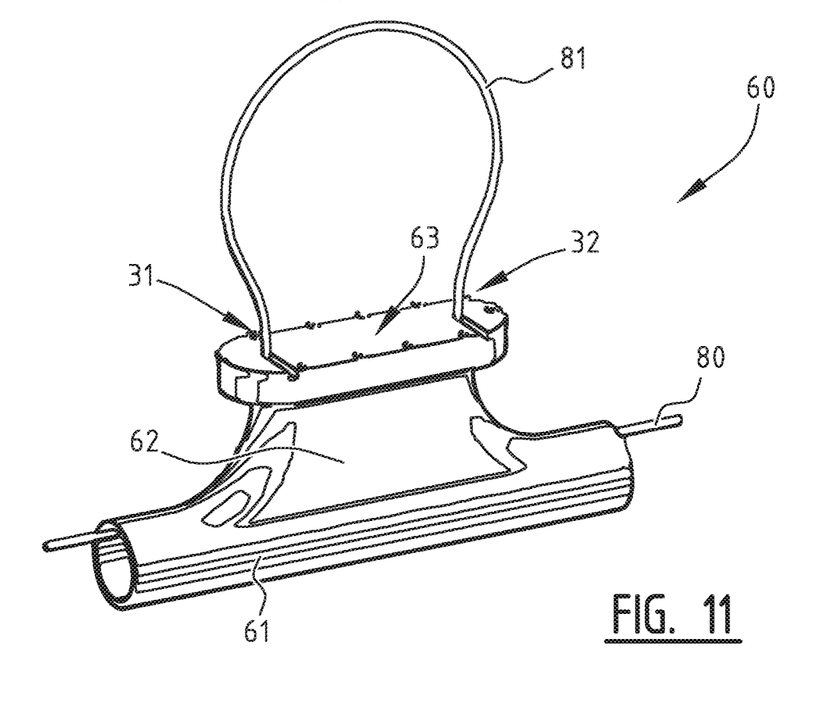
FIG. 11 is a schematic side view of a segment placeable in a medium conduit.
Figure 12:
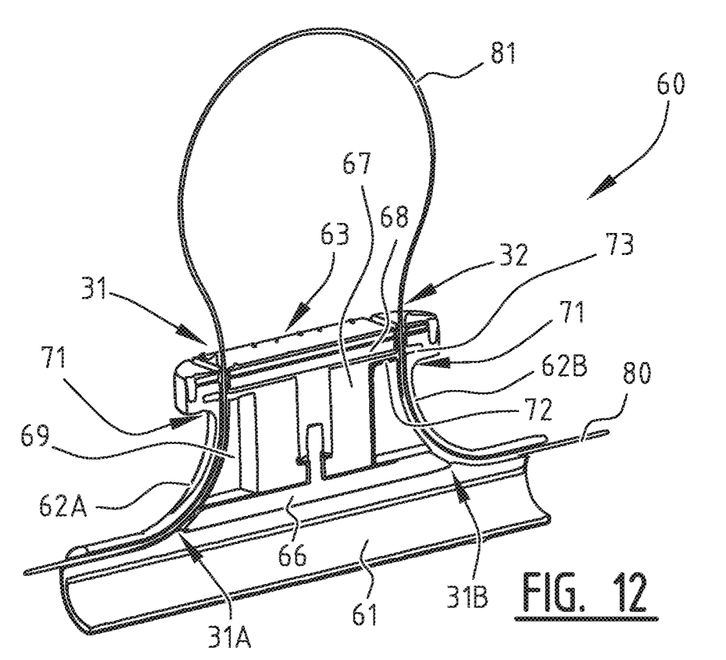
FIG. 12 is a schematic section of the segment shown in FIG. 11.

FIG. 11 is a schematic side view of a segment 60 placeable in a medium conduit according to the invention. FIG. 12 shows a schematic section corresponding to FIG. 11. It is noted that only a single embodiment of segment 60 is shown here and that variations are very well possible.

Segment 60 according to FIG. 11 comprises a pipe part 60, a neck 62 and a cover 63. A first and a second cable passage 31 32, here in the form of grooves, are arranged in cover 63. As shown in FIG. 11, it is not necessary for the grooves to wholly transect the cover. A cable 80 is guided through cable passages 31, 32 so as to form a loop 81. As stated above, loop 81 can be used to define a house connection. If desired, a cable tensioner can be arranged on cover 63 with which the cable can be tensioned in the pipe part and the pipe connected thereto. Owing to the cable tensioner the loop 81 in cable 80 can have a variable length without cable 80 hanging loosely in the pipe. Pipe part 61 is for instance connected with sliding sleeves to the pipe (not shown), whereby a rotation from a protected position to a servicing position is possible. The position show in FIG. 10 and FIG. 11 is the servicing position.

The section of FIG. 12 shows the structure of segment 60 in detail. Different design requirements are taken into account in the design of segment 60. A first requirement is that cable 80 be guided out of pipe part 61 to the outside. This is fulfilled by the choice of the form of neck 62, wherein the side parts 62A, 62B effectively guide the cable.

A pipe closure 66 of pipe part 61 is further formed. This pipe closure 66 takes a form corresponding if possible to the form of an inner wall of pipe part 61. The advantage hereof is that objects such as pulling members, cleaning elements and test elements will flow normally past neck 62 without moving out of their path.

Situated between the side wall of neck 62 and pipe closure 66 are openings 31A, 32A which are suitable and intended for passage of cable 80. The sides of pipe closure 66 are formed for a good connection. The opening taking the form of a groove into which the cable fits is not precluded.

In the shown embodiment the pipe closure 66 as an upright part so that the closure is particularly T-shaped. This appears to be a suitable implementation for connecting pipe closure 66 and spacer 67 to each other. The division into a pipe closure 66 and a spacer 67 is prompted by assembly reasons, in particular that pipe closure 66 is first inserted into the segment at the top via the opening, then placed in the desired position and orientation and subsequently connected to the subsequently inserted spacer 67. Diverse mechanisms are suitable as connecting mechanism, such as a snap mechanism, a connection with screws, bolts or even an adhesive connection.

Spacer 67 is formed here in a U-shape. In a favourable embodiment spacer 67 is formed as one whole, although the two legs of the U-shape being separate parts is not precluded. Nor is a form other than a U-shape precluded. An additional advantage of the U-shape is the presence of a cavity 69. When space is left between the pipe closure and the side wall of the neck (i.e. at openings 31A, 31B), this cavity 69 provides the additional advantage of compensating a pressure difference between the pipe and the outside pressure.

Spacer 67 is provided in this embodiment with an upper plate 72 which fits into a cavity 73 in a protrusion 71 on neck 62. Upper plate 73 hereby rests in stable manner against neck 62. Pressure can thus be exerted from above for a closing fit of the cover and to close the opening of segment 60. Use is preferably made for this purpose of a deformable element 68, for instance of rubber-elastic material. Cover 63 itself is then placed thereon and preferably secured in known manner. The cover is typically made from a construction material such as stainless steel. Neck 62 and pipe part 61 are for instance made from a plastic, although other materials known in the art can likewise be applied.

Figure 13:
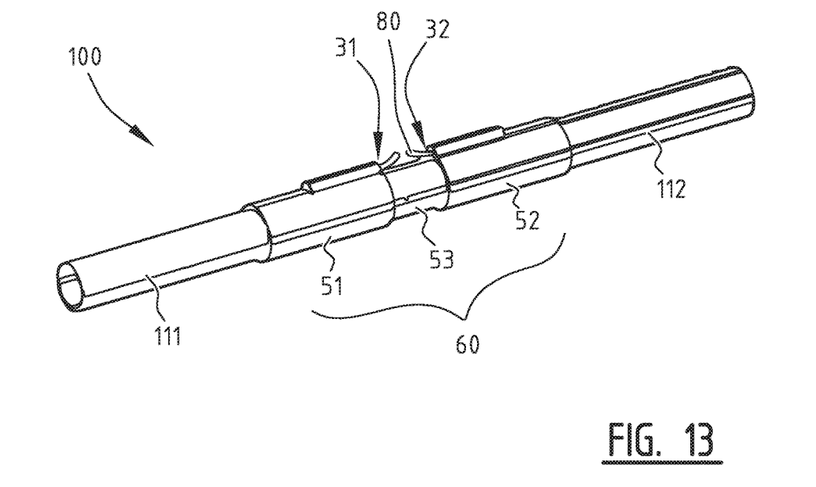
FIG. 13 is a schematic side view of a medium conduit with shell placed therein.
Figure 14:
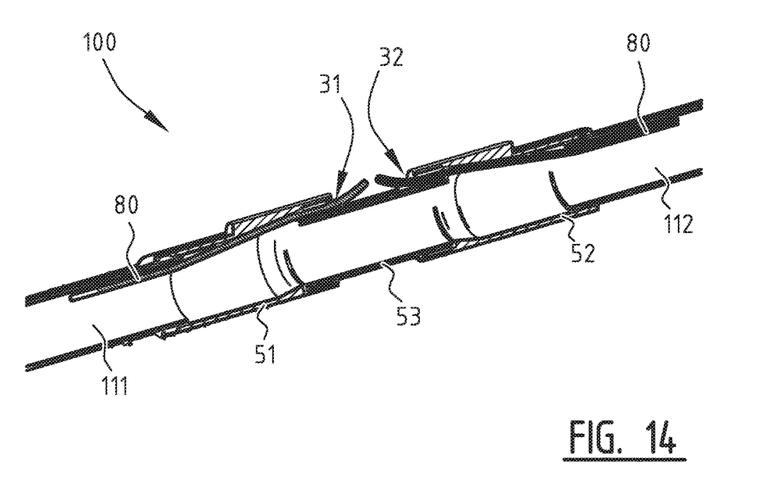
FIG. 14 is a schematic section of the medium conduit shown in FIG. 13.

FIGS. 13 and 14 show a further embodiment of a medium conduit 100 which can be deemed as a variant of the embodiment shown in FIG. 9. In this embodiment the segment 60 effectively comprises a first shell 51, a second shell 52 and a pipe part 53 therebetween. Fixed to first shell 51 is a first cable passage 31; fixed to second shell 52 is a second cable passage 32. In this embodiment the connection of first shell 51 to first pipe part 111 and of second shell 52 to second pipe part 112 is such that segment 60 can be rotated from a protected position to a servicing position.

FIGS. 13 and 14 show no further cable guide than that defined by the form of cable passages 31, 32. Nor is a cable tensioner shown. Specific cable guides and one or more cable tensioners can also be arranged if desired.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. Method for arranging a cable in a pipe of a medium conduit suitable for transport of a medium using pressure, the method comprising the steps of:
    inserting a segment into a pipe, said segment being arranged at a first longitudinal position between a first and a second point, said segment being provided with a first and a second cable passage to an outside, and with means for closing off the first and second cable passage;
    supplying liquid and/or applying pressure in at least a part of the medium conduit extending from the first point;
    drawing the cable through the pipe of the medium conduit from the first point downstream to the second point, wherein the cable is carried along by the liquid and/or the pressure in the medium conduit, wherein an outer end of the cable is taken out of the medium conduit at the second point;
    opening the segment;
    taking a piece of the cable out at the first longitudinal position while forming a loop, and subsequently closing the segment,
    wherein the cable is passed through the cable passage, and
    rotating the segment to a protected position in which the cable passage and the cable carried outside are protected from damage by excavation work by means of the pipe or a shell arranged in a longitudinal opening between a first and a second pipe part of the pipe.

2. Method as claimed in claim 1, wherein the protected position is arranged at a lower side of the pipe, whereas the servicing position is arranged at an upper side of the pipe.

3. Method as claimed in claim 1, wherein the cable passage is protected in the protected position by means of the pipe or by means of a shell arranged in a longitudinal opening between a first and a second pipe part of the pipe.

4. Method as claimed in claim 1, wherein a part of the cable located in the pipe is guided from the first longitudinal position to a desired radial position in the pipe after forming of the loop.

5. Method as claimed in claim 1, wherein pieces of the cable are taken out of the medium conduit at various longitudinal positions between the first and the second or third point by:
    inserting segments into the pipe prior to provision of the cable, said segments being arranged at said various longitudinal position between the first and the second or the third point, each of said segments being provided with a first and a second cable passage to an outside;
    opening a segment in the pipe at a longitudinal position between the first and the second point;
    taking out the piece of the cable while forming a loop at the associated longitudinal position and subsequently closing the segment, wherein the cable is passed through the cable passage, and
    rotating the segment to a protected position in which the cable passage and the cable carried outside are protected from damage by excavation work by means of the pipe or a shell arranged in a longitudinal opening between a first and a second pipe part of the pipe.

6. Method as claimed in claim 1, wherein the cable is provided with a liquid pressure generator such that pressure forms downstream of the liquid pressure generator, whereby the cable can be displaced through the medium conduit, wherein the liquid pressure generator is part of a pulling member situated on an outer end of the cable, and wherein the liquid pressure generator comprises an elastic ring with which a diameter of the liquid pressure generator is adapted to a diameter of the pipe of the medium conduit.

7. Method as claimed in claim 1, wherein a portion of cable extending in the pipe is tensioned from the first longitudinal position, in particular by using a cable tensioner at the first cable passage.

8. Method as claimed in claim 1, wherein the cable is a glass fiber cable.

9. Method as claimed in claim 1, wherein the first point and the second point are inspection wells.

10. Method as claimed in claim 1, wherein the medium conduit is chosen from one of a pressure sewer, a water conduit and a gas conduit.

11. Method as claimed in claim 1 wherein the segment comprises a pipe part with an opening, and a shell arranged around said pipe part that is provided with the first and second cable passages,
    wherein the step of opening the segment includes removal of the shell and therewith opening of the opening in the pipe part, and
    wherein the step of closing the segment includes re-assembly of the shell.

12. Method as claimed in claim 1 wherein the segment comprises a pipe part, a neck and a cover, wherein the first and the second cable passage are arranged in the cover in the form of grooves, and
    wherein opening and closing the segment includes removal and replacement of the cover.

13. Method as claimed in claim 1 wherein the segment comprises a first shell, a second shell and a pipe part there between, which first and second shell extend to an outside of the pipe part, wherein the first cable passage is fixed to the first shell and the second cable passage is fixed to the second shell, and
    wherein opening of the segment includes removal of the pipe part, and wherein the closing of the segment includes insertion of a pipe part, such that the cable passages are at least partly arranged at an outside of the pipe part.

14. Method for providing at a first longitudinal position a house connection to a cable which is part of a cable network intended for communication purposes, comprising the steps of:
providing a medium conduit provided with a first cable passage and a second cable passage defined in a rotatable segment, said rotatable segment having a protection position and a servicing position, which protected position the cable passage is protected from damage by excavation work;
rotating the first and the second cable passage from the protected position to a servicing position;
connecting a house connection cable to the cable, and
rotating the first and the second cable passage from the servicing position to the protected position.

15. Method as claimed in claim 14, wherein the protected position is arranged at a lower side of the pipe, whereas the servicing position is arranged at an upper side of the pipe.

16. Method as claimed in claim 14, wherein in the protected position the cable passage is protected from damage during excavation work by means of the pipe or a shell arranged in a longitudinal opening between a first and a second pipe part of the pipe.

17. Method as claimed in claim 14, further comprising the step of taking a piece of the cable out at the first longitudinal position while forming a loop, after rotating the cable passage into the servicing position.

18. Medium conduit suitable for transport of a medium using pressure and comprises a first and a second inspection well, a pipe between said inspection wells, said pipe being provided at a first longitudinal position between said first and second inspection well with a pipe opening and a manifold covering said pipe opening, wherein the manifold comprises a first cable passage through which a portion of the cable is brought outside the pipe for forming a loop, which manifold with the first cable passage is rotatable between a servicing position and a protected position in which the cable passage and the cable carried outside are protected from damage by excavation work.

19. Medium conduit according to claim 18, wherein the cable loop is connected to a house connection cable so as to establish a house connection.

* * * * *